(12) United States Patent
Turan

(10) Patent No.: US 11,660,954 B2
(45) Date of Patent: May 30, 2023

(54) FUEL TANK DEVICE

(71) Applicant: MAGNA Energy Storage Systems GesmbH, Sinabelkirchen (AT)

(72) Inventor: Alparslan Turan, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 85 days.

(21) Appl. No.: 17/319,255

(22) Filed: May 13, 2021

(65) Prior Publication Data

US 2022/0009345 A1 Jan. 13, 2022

(30) Foreign Application Priority Data

Jul. 9, 2020 (EP) .................................... 20184925

(51) Int. Cl.
*B60K 15/04* (2006.01)
*B60K 15/035* (2006.01)
*B60K 15/03* (2006.01)

(52) U.S. Cl.
CPC .... *B60K 15/04* (2013.01); *B60K 2015/03401* (2013.01); *B60K 2015/03493* (2013.01); *B60K 2015/03538* (2013.01); *B60K 2015/0458* (2013.01)

(58) Field of Classification Search
CPC .......... B60K 15/04; B60K 2015/03401; B60K 2015/0349; B60K 2015/03538
USPC ....................................................... 220/88.1
See application file for complete search history.

(56) References Cited

U.S. PATENT DOCUMENTS

| | | | | |
|---|---|---|---|---|
| 5,567,296 A * | 10/1996 | Luch | ................ | B60K 15/03177 205/176 |
| 2002/0110658 A1* | 8/2002 | Lucke | ........................ | B32B 1/02 264/320 |
| 2006/0113104 A1* | 6/2006 | Loevenbruck | ......... | B60K 15/04 174/78 |
| 2006/0163243 A1* | 7/2006 | Stieler | ................... | B29C 66/534 219/609 |
| 2007/0261752 A1* | 11/2007 | McClung | ................ | F16L 11/20 138/140 |
| 2015/0151632 A1* | 6/2015 | Fujiwara | ................ | B60K 15/04 220/86.2 |
| 2015/0239340 A1* | 8/2015 | Kito | ........................ | B60K 15/04 220/86.1 |
| 2015/0375615 A1* | 12/2015 | Brown | ............... | B60K 15/0406 220/86.1 |
| 2020/0039457 A1* | 2/2020 | Dawe | ................. | F02M 37/0017 |

(Continued)

FOREIGN PATENT DOCUMENTS

| | | |
|---|---|---|
| DE | 10311320 A1 | 11/2003 |
| DE | 10304067 A1 | 8/2004 |

(Continued)

*Primary Examiner* — J. Gregory Pickett
*Assistant Examiner* — Niki M Eloshway
(74) *Attorney, Agent, or Firm* — Jordan IP Law, LLC; Todd A. Vaughn

(57) ABSTRACT

A fuel tank device for a vehicle that includes a plastic fuel tank having a conductive outer layer, a plastic filler pipe for filling the fuel tank, at least one metallic component, and an electrical connector to connect the metallic component to the conductive outer layer of the filler pipe. The metallic component is grounded via the electrical connector and the conductive outer layer of the filler pipe.

20 Claims, 3 Drawing Sheets

(56) References Cited

U.S. PATENT DOCUMENTS

| | | | | |
|---|---|---|---|---|
| 2020/0101837 A1* | 4/2020 | Mason | ................... | B60K 15/04 |
| 2020/0269681 A1* | 8/2020 | Padilla Heredia | ..... | B60K 15/04 |
| 2020/0376956 A1* | 12/2020 | Dufendach | ............ | B60K 15/05 |
| 2021/0221222 A1* | 7/2021 | Steinmann | .............. | F16L 33/22 |

FOREIGN PATENT DOCUMENTS

| | | | | | |
|---|---|---|---|---|---|
| EP | | 2186669 A1 | | 5/2010 | |
| WO | WO-2007042536 A1 | * | 4/2007 | ............. | B60K 15/04 |

\* cited by examiner

FUEL TANK DEVICE

CROSS-REFERENCE TO RELATED APPLICATIONS

The present application claims priority 35 U.S.C. § 119 to European Patent Publication No. EP 20184925.4 (filed on Jul. 9, 2020), which is hereby incorporated by reference in its entirety.

TECHNICAL FIELD

One or more embodiments relate to a fuel tank device of a vehicle.

BACKGROUND

Fuel tanks for receiving the fuel of a motor vehicle are well known. Filler pipes are conventionally used to fill the tank and can extend from a tank neck, which is accessible for refuelling, to the tank. In more recent times, tanks composed of plastic are also used, as well as filler pipes composed of plastic, which are lighter and can be manufactured more cost-effectively than previously conventional tanks and filler pipes composed of metal. Even if, however, the tank itself and/or at least its filler pipe is produced from plastic, some components of a fuel tank device are still produced from metal, for example, tension bands or heat-shielding plates.

For such metallic components, there exists a problem of electrically grounding the components in spite of the plastic parts in the vicinity thereof. For example, the metallic components, when used with a plastic filler pipe, are grounded via a grounding cable, which is routed along the filler pipe and whereof the end is connected to the vehicle body in the region of the tank neck. This solution, however, is complicated and expensive to manufacture since the precise path of the grounding cable has to be secured at several positions and monitored during production, for example via camera inspection. The handling of the tank during production is more difficult as a result of the long grounding cable.

SUMMARY

One or more embodiments are to enhance a fuel tank device of a vehicle of such type in this regard and, in particular, to provide a fuel tank device which can be produced quickly and favorably whilst enabling reliable grounding of metallic components of the fuel tank device.

In accordance with one or more embodiments, a fuel tank device of a vehicle comprises a fuel tank composed of plastic; a filler pipe, composed of plastic and having a conductive outer layer, for filling the fuel tank; and at least one metallic component connected to the conductive outer layer of the filler pipe via an electrical connector in such a manner as to ground the metallic component (i.e., grounded via the connection and the conductive outer layer of the filler pipe).

In accordance with one or more embodiments, a metallic component of the tank, for example a metallic tension band, is grounded via the filler pipe that is composed of plastic without routing an electrical line along the filler pipe. Instead, the filler pipe, namely, a conducting outer layer of a multi-layered plastic filler pipe, is used directly to ground the component. The metallic component is connected to the conducting outer layer of the filler pipe via a suitable electrically conductive connection. The grounding or ground connection is then ultimately realized via the other end of the filler pipe, at which the outer layer of the filler pipe is connected in an electrically conducting manner to a suitable electrical ground, in particular, to the body of the motor vehicle.

The electrical connector preferably comprises a connection lug member composed of metal. The connection lug extends out of the filler pipe in a manner such that an electrically conducting connection is established between the connection lug and the conductive outer layer of the filler pipe.

The connection lug member is preferably also injected into a plastic structure of the filler pipe, in particular, into a line holder such as, for example, into a line clip. The line holder can preferably serve to fasten a vent line. The line holder, in particular line clip, preferably comprises a conductive material.

The electrical connector, in particular, the connection lug member, is preferably formed at the end of the filler pipe which is remote from the refuelling opening, i.e., in a region of the filler pipe which is near to the bottom end of the filler pipe in the installation position. Grounding then takes place to a large extent via the filler pipe and, to a lesser extent, via a grounding cable connected to the electrical connector.

The grounding of the component takes place via the electrical connector and the conductive outer layer of the filler pipe. The electrically conducting outer layer of the filler pipe, at the end of the filler pipe which faces the refuelling opening, is preferably connected to the body of the vehicle in an electrically conducting manner in order to bring about grounding via the vehicle body.

The electrically conducting outer layer of the filler pipe at the end of the filler pipe which faces the refuelling opening is preferably connected in an electrically conducting manner to a closure base composed of metal. The closure base can be designed to receive a pump nozzle and can be closed by a closure cap.

The electrically conducting outer layer of the filler pipe can be connected in an electrically conducting manner to the closure base composed of metal via a press connection. The closure base preferably abuts against the outside of the filler pipe, and therefore, against the electrically conducting outer layer. A plurality of ribs are preferably formed on the outside of the filler pipe in the region of the press connection.

The metallic component which is to be grounded can be, in particular, a tension band, a heat-shielding plate and/or a reinforcing ring of a service opening of the fuel tank. The metallic component can be connected to the connection, in particular to the connection lug, in an electrically conducting manner via a grounding cable, wherein the grounding cable is preferably designed to be short, shorter than the filler pipe and preferably shorter than half the filler pipe. The grounding cable is preferably designed to be shorter than 30 cm, particularly preferably shorter than 20 cm.

DRAWINGS

One or more embodiments will be illustrated by way of example in the drawings and explained in the description hereinbelow.

DESCRIPTION

Figure 1:
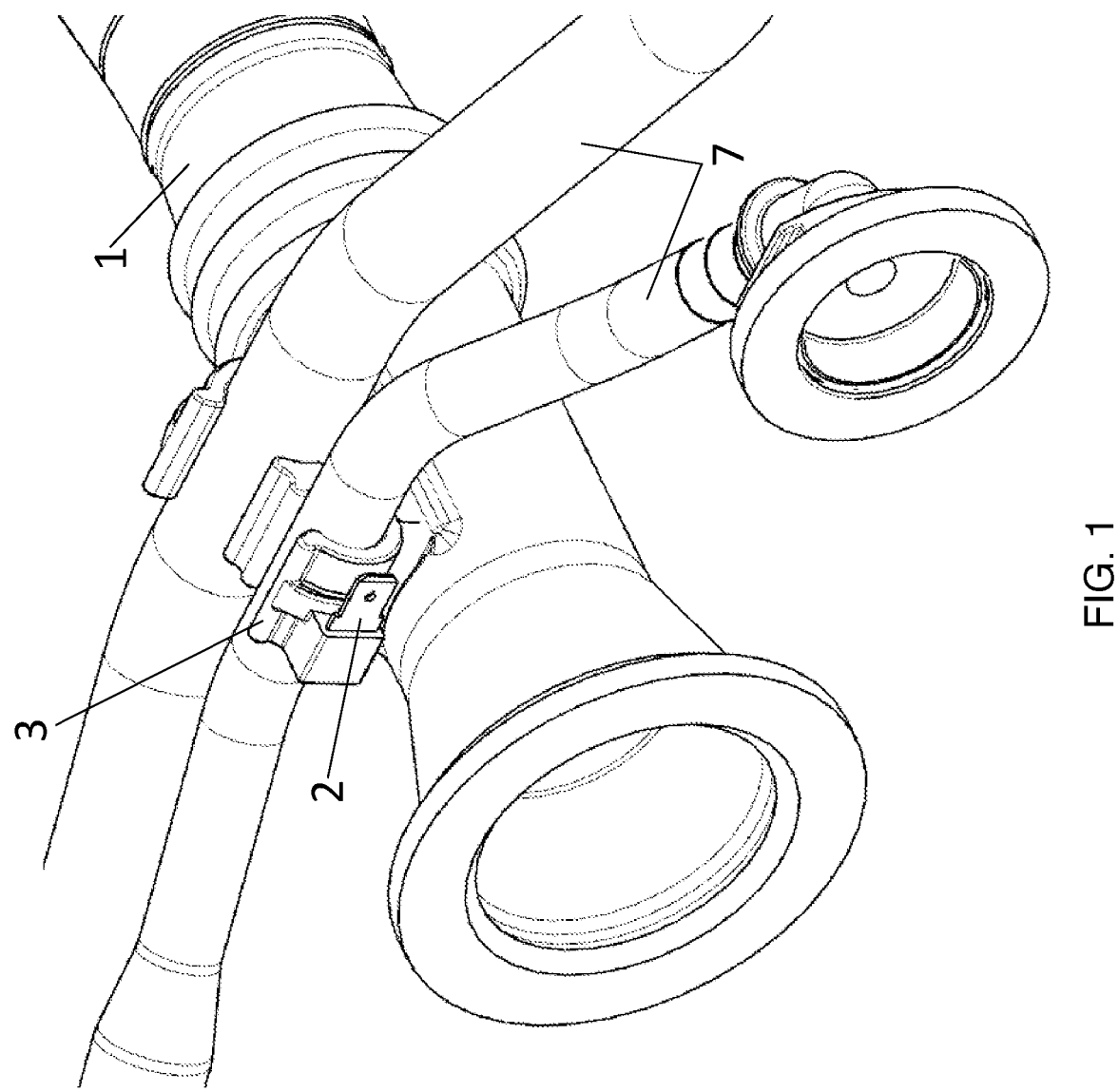
FIG. 1 illustrates a three-dimensional view of the bottom end of a filler pipe of a fuel tank device in accordance with one or more embodiments.

FIG. 1 illustrates the bottom end of a filler pipe 1 (as seen in the installation position) of an inventive fuel tank device, which bottom end is remote from the filler opening of the filler pipe 1.

The filler pipe 1 is manufactured from a plastic and has a conductive outer layer. An electrical connector 2, namely a connection lug member composed of metal, extends out of the filler pipe 1. The electrical connector 2 is connected to the outer layer of the filler pipe 1 in an electrically conducting manner.

The electrical connector 2, in particular, the connection lug member, is formed at the end of the filler pipe 1 which is remote from the refuelling opening, i.e., in a region of the filler pipe which is located at the bottom in the installation position.

The connection lug is also injected into a plastic structure of the filler pipe 1, namely, into a line clip 3, into which one or more vent lines 7 can be clipped. The line clip 3 comprises a conductive material, preferably of conductive plastic.

Figure 2:
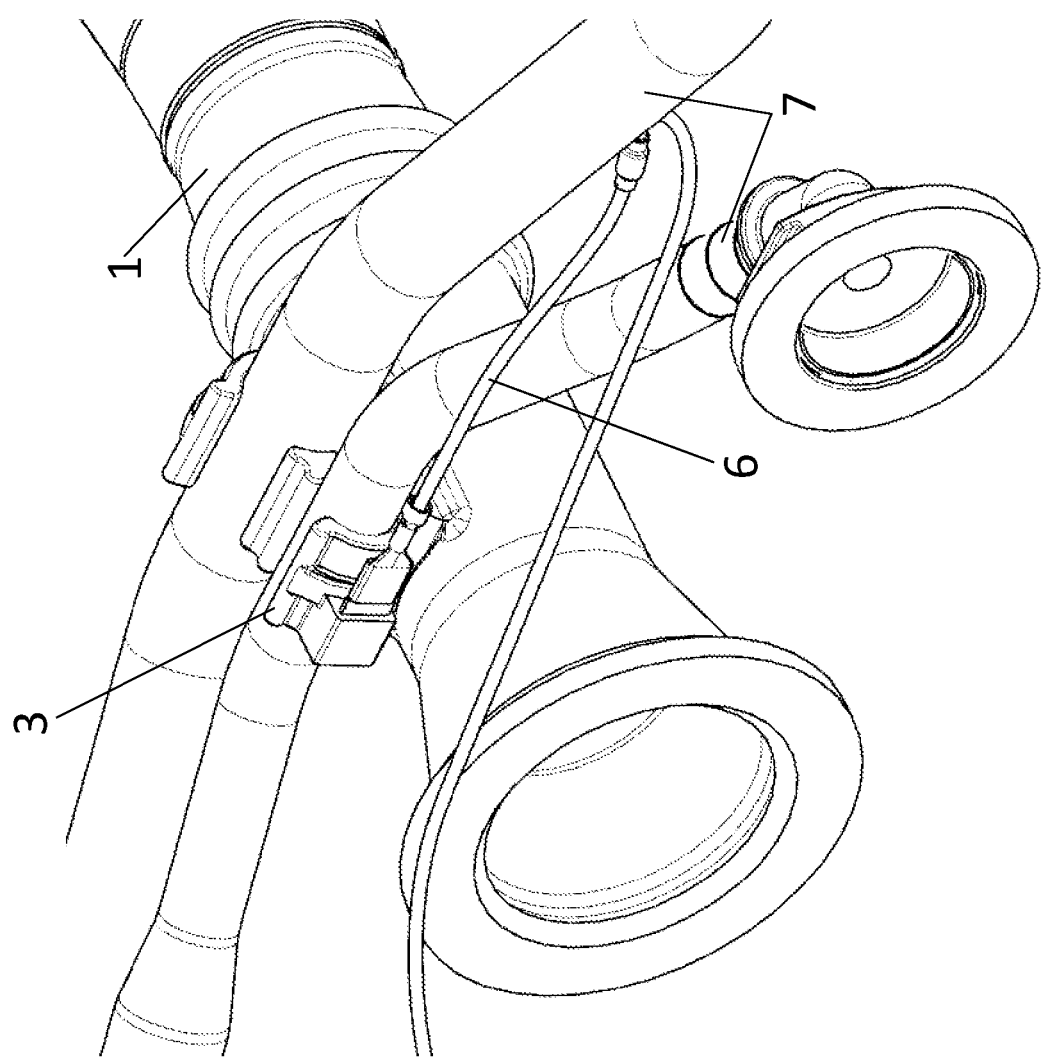
FIG. 2 illustrates a three-dimensional view of the bottom end of the filler pipe of FIG. 1, with a connected grounding cable.

As illustrated in FIG. 2, a metallic component of the fuel tank device, for example, a tension band, a heat-shielding plate, or a reinforcing ring of a service opening of the fuel tank, which is likewise arranged near to the bottom end of the filler pipe, at least in some sections, is connected to the electrical connector 2, in particular, to the connection lug member, in an electrically conducting manner via a short grounding cable 6. The metallic component is grounded via the electrical connector 2 and the conductive outer layer of the filler pipe 1.

Figure 3:
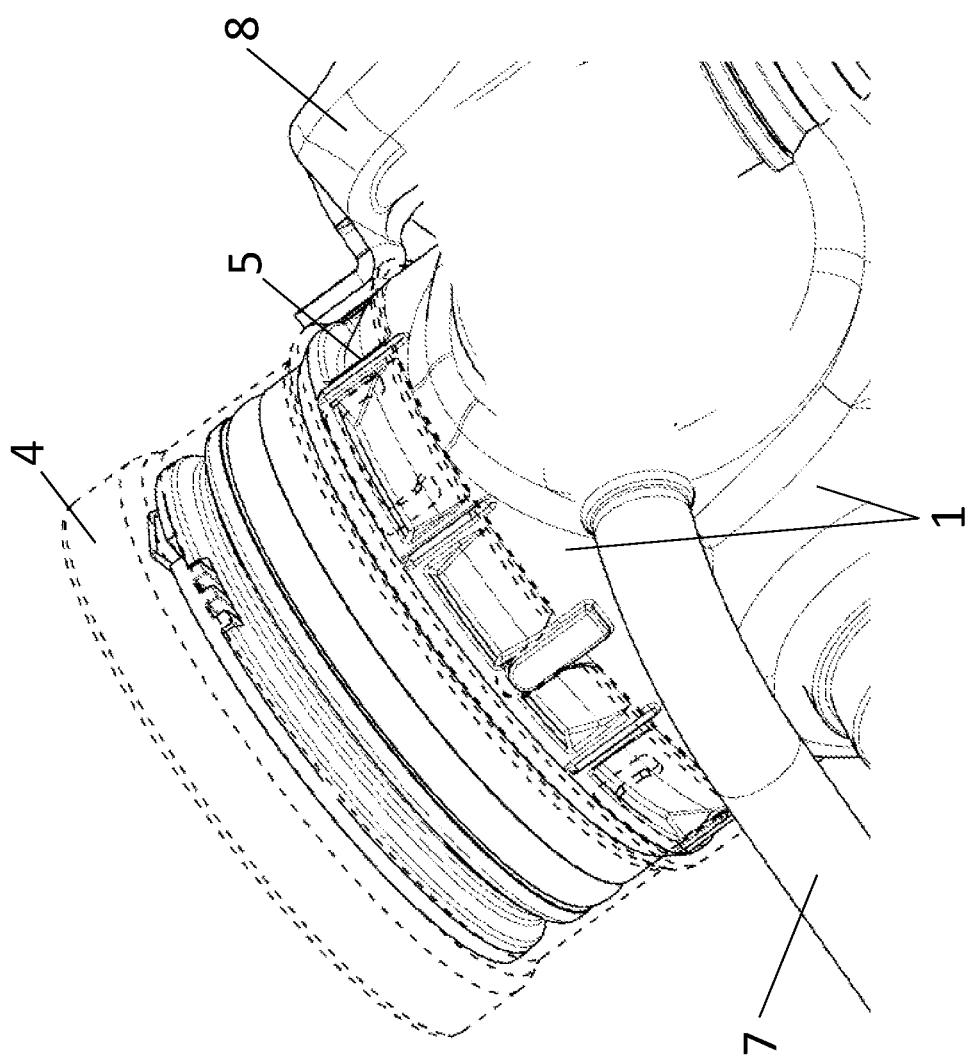
FIG. 3 illustrates a three-dimensional view of the top end of a filler pipe of a fuel tank device in accordance with one or more embodiments.

After the electrical connector 2 and the conductive outer layer of the filler pipe 1, the grounding of the component takes place via the body of the vehicle at the end of the filler pipe 1 (illustrated in FIG. 3) which faces the refuelling opening. To this end, the filler pipe 1 is connected to the vehicle body via an electrically conductive connecting part 8.

The electrically conducting outer layer of the filler pipe 1 is also connected in an electrically conducting manner to a closure base 4 composed of metal at the end of the filler pipe which faces the refuelling opening.

The electrically conducting outer layer of the filler pipe 1 is connected in an electrically conducting manner to the closure base 4 composed of metal via a press connection, which closure base abuts against the outside of the filler pipe 4. Electrically conductive ribs 5 are formed on the outside of the filler pipe 1 in the region of the press connection.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Filler pipe
2 Electrical connector
3 Line holder
4 Closure base
5 Ribs
6 Grounding cable
7 Vent line
8 Connecting part

What is claimed is:

1. A fuel tank device for a vehicle, comprising:
a fuel tank, composed of plastic and having a conductive outer layer;
a filler pipe, composed of plastic with an electrically conductive outer layer, for filling the fuel tank;
at least one metallic component; and
an electrical connector to connect the metallic component to the conductive outer layer of the filler pipe, the electrical connector including a connection lug member composed of metal that extends out of the filler pipe to establish an electrically conducting connection between the connection lug member and the electrically conductive outer layer of the filler pipe, wherein the metallic component is grounded via the electrical connector and the electrically conductive outer layer of the filler pipe.

2. The fuel tank device of claim 1, wherein the connection lug member is integrated into the plastic of the filler pipe.

3. The fuel tank device of claim 1, wherein the connection lug member is formed at an end of the filler pipe which is remote from a refuelling opening.

4. The fuel tank device of claim 1, wherein the electrically conductive outer layer of the filler pipe is arranged at an end of the filler pipe which faces a refuelling opening.

5. The fuel tank device of claim 4, wherein the electrically conductive outer layer of the filler pipe is connected to a body of the vehicle in an electrically conducting manner.

6. The fuel tank device of claim 1, wherein the electrically conductive outer layer of the filler pipe, at an end of the filler pipe which faces a refuelling opening, is connected in an electrically conducting manner to a closure base composed of metal.

7. The fuel tank device of claim 6, wherein the electrically conductive outer layer is connected in an electrically conducting manner to the closure base via a press connection.

8. The fuel tank device of claim 7, further comprising a plurality of ribs formed on an outside of the filler pipe in a region of the press connection.

9. The fuel tank device of claim 1, wherein the at least one metallic component comprises a tension band.

10. The fuel tank device of claim 1, wherein the at least one metallic component comprises a heat-shielding plate.

11. The fuel tank device of claim 1, wherein the at least one metallic component comprises a reinforcing ring of a service opening of the fuel tank.

12. The fuel tank device of claim 1, wherein the at least one metallic component is connected to the electrical connector via a grounding cable in an electrically conducting manner.

13. A fuel tank device for a vehicle, comprising:
a fuel tank, composed of plastic and having a conductive outer layer;

a filler pipe, composed of plastic with an electrically conductive outer layer, for filling the fuel tank;

at least one metallic component; and a connection lug member, composed of metal, to connect the metallic component to the conductive outer layer of the filler pipe, the electrical connector including a connection lug member composed of metal that extends out of the filler pipe to establish an electrically conducting connection between the connection lug member and the electrically conductive outer layer of the filler pipe, wherein the metallic component is grounded via the connection lug member and the electrically conductive outer layer of the filler pipe.

14. The fuel tank device of claim 13, wherein the electrically conductive outer layer of the filler pipe is arranged at an end of the filler pipe which faces a refuelling opening, and is connected to a body of the vehicle in an electrically conducting manner.

15. The fuel tank device of claim 13, wherein the electrically conductive outer layer of the filler pipe is arranged at an end of the filler pipe which faces a refuelling opening, is connected to a closure base composed of metal in an electrically conducting manner.

16. The fuel tank device of claim 15, wherein the electrically conductive outer layer is connected to the closure base via a press connection in an electrically conducting manner.

17. The fuel tank device of claim 16, further comprising a plurality of ribs formed on an outside of the filler pipe in a region of the press connection.

18. A fuel tank device for a vehicle, comprising:

a vent line;

a filler pipe, having a multi-layered configuration that includes plastic with an electrically conductive outer layer, for filling a fuel tank of the vehicle, the filler pipe having a line clip to fasten the vent line to the filler pipe;

a closure base, to receive a pump nozzle, composed of metal and connected in an electrically conducting manner to the electrically conductive outer layer; and an electrical connector, composed of metal that is integrated into the line clip at an end of the filler pipe which is remote from a refuelling opening, to establish an electrically conducting connection between the electrical connector and the electrically conductive outer layer.

19. The fuel tank device of claim 18, wherein the line clip is composed of an electrically conductive plastic material.

20. The fuel tank device of claim 18, further comprising electrically conductive ribs formed on the filler pipe in the region of the connection between the filler pipe and the closure base.

* * * * *